United States Patent [19]

Hinchliff

[11] 3,796,457
[45] Mar. 12, 1974

[54] TRAILER CONSTRUCTION
[75] Inventor: Richard W. Hinchliff, Vancouver, Wash.
[73] Assignee: Merritt Equipment Co., Portland, Oreg.
[22] Filed: Apr. 12, 1972
[21] Appl. No.: 243,275

[52] U.S. Cl. .............................. 296/28 M, 105/367
[51] Int. Cl. ............................................ B62d 33/04
[58] Field of Search............... 296/28 M, 25; 280/2; 105/367

[56] References Cited
UNITED STATES PATENTS
| 1,544,816 | 7/1925 | Cummings | 280/2 |
| 2,602,405 | 7/1952 | Johansson | 296/28 M |
| 2,172,571 | 9/1939 | Theriault | 296/28 M |
| 3,103,379 | 9/1963 | Stone et al. | 296/28 M |
| 2,363,170 | 11/1944 | Fontaine | 296/28 M |
| 2,901,283 | 8/1959 | Curell | 296/28 M |

Primary Examiner—David Schonberg
Assistant Examiner—John A. Pekar
Attorney, Agent, or Firm—Eugene M. Eckelman

[57] ABSTRACT

A trailer which although of extremely light weight is rugged in construction for hauling a maximum load with relation to the weight of the trailer. The trailer employs front and rear frame sub-assemblies formed of lightweight frame components. The front and rear frame sub-assemblies are spaced longitudinally from each other and are interconnected by longitudinal rails. Vertical and longitudinal reinforcement is accomplished by sheet metal side walls and upright channel-shaped posts. Each of the front and rear frame sub-assemblies has vertically elongated, side gusset plates secured integrally thereto as well as to the longitudinal rails, the sheet metal side walls, and some of the upright posts. The vehicle has decking secured to frame members for supporting the load, such decking being secured in place to add reinforcement to the trailer.

6 Claims, 14 Drawing Figures

PATENTED MAR 12 1974 3,796,457
SHEET 1 OF 5
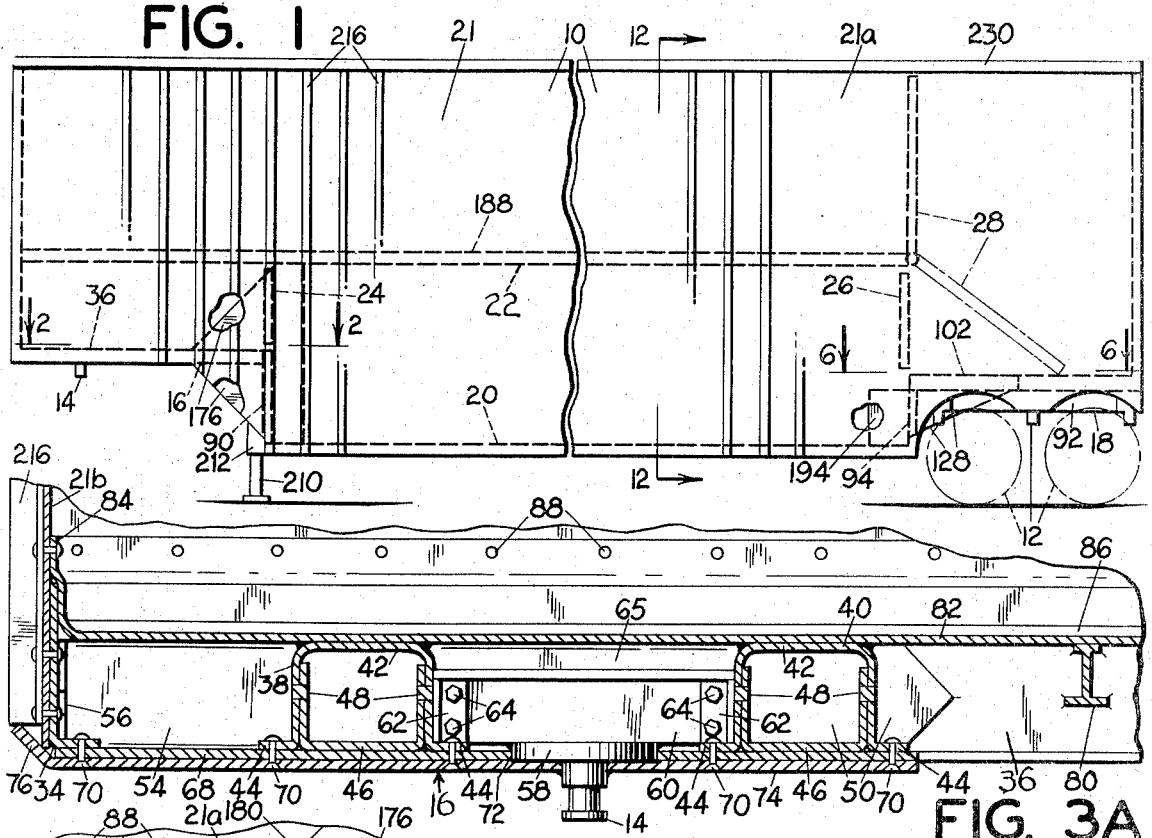
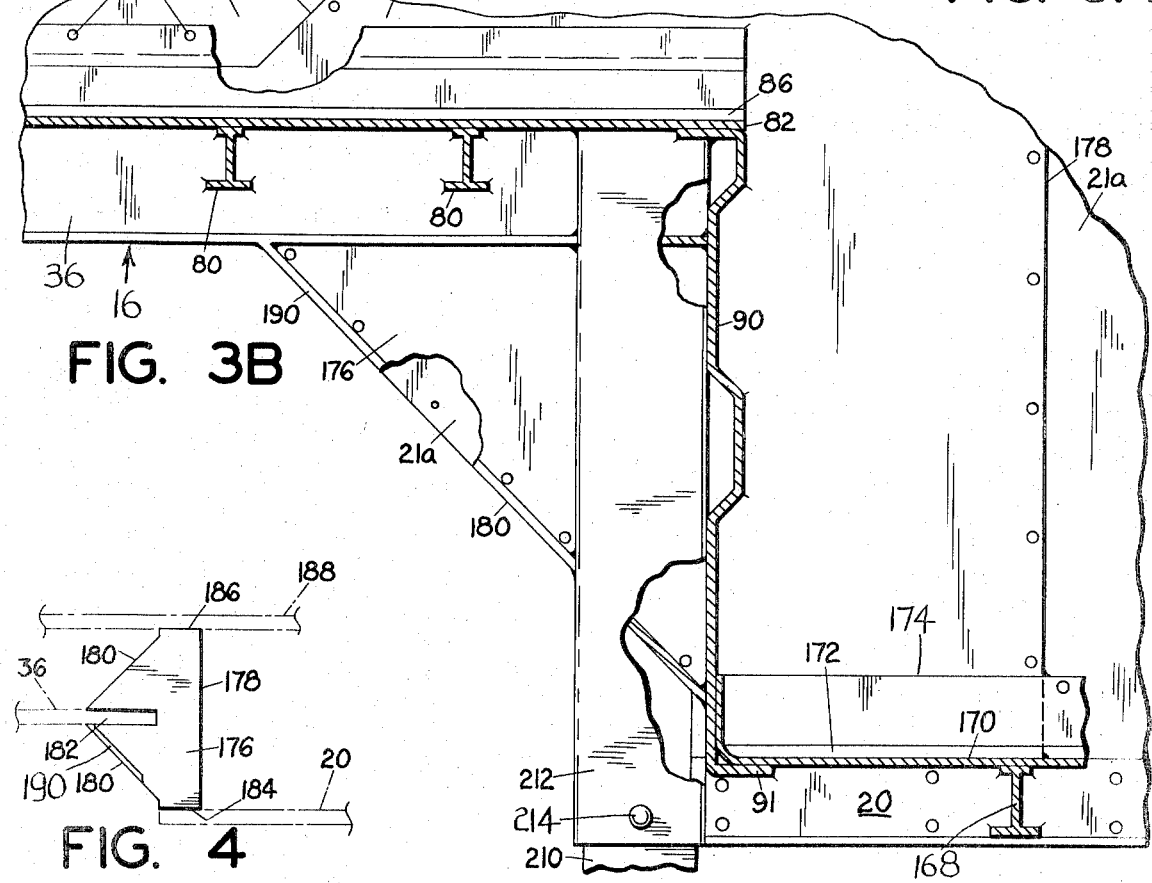

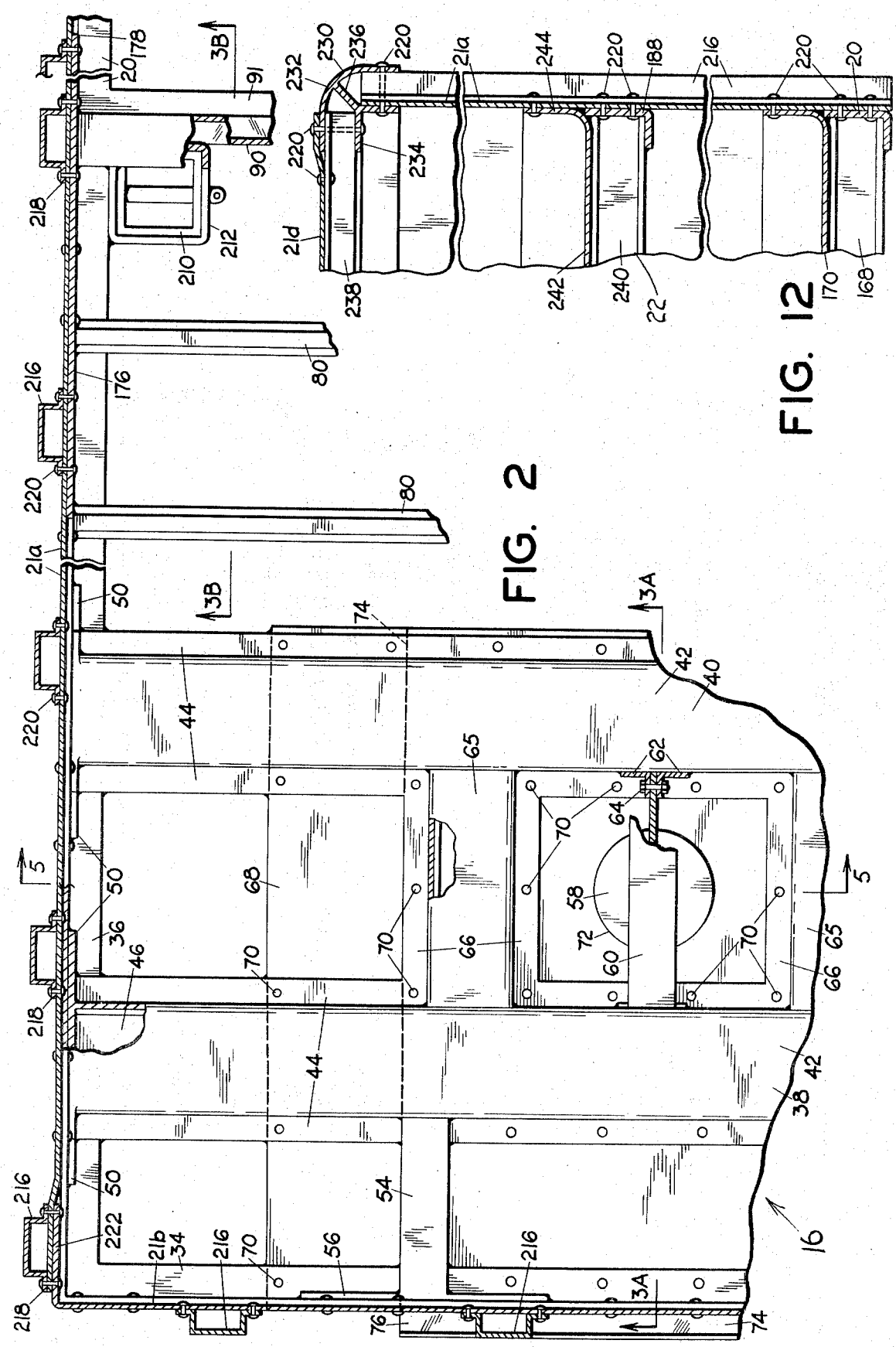

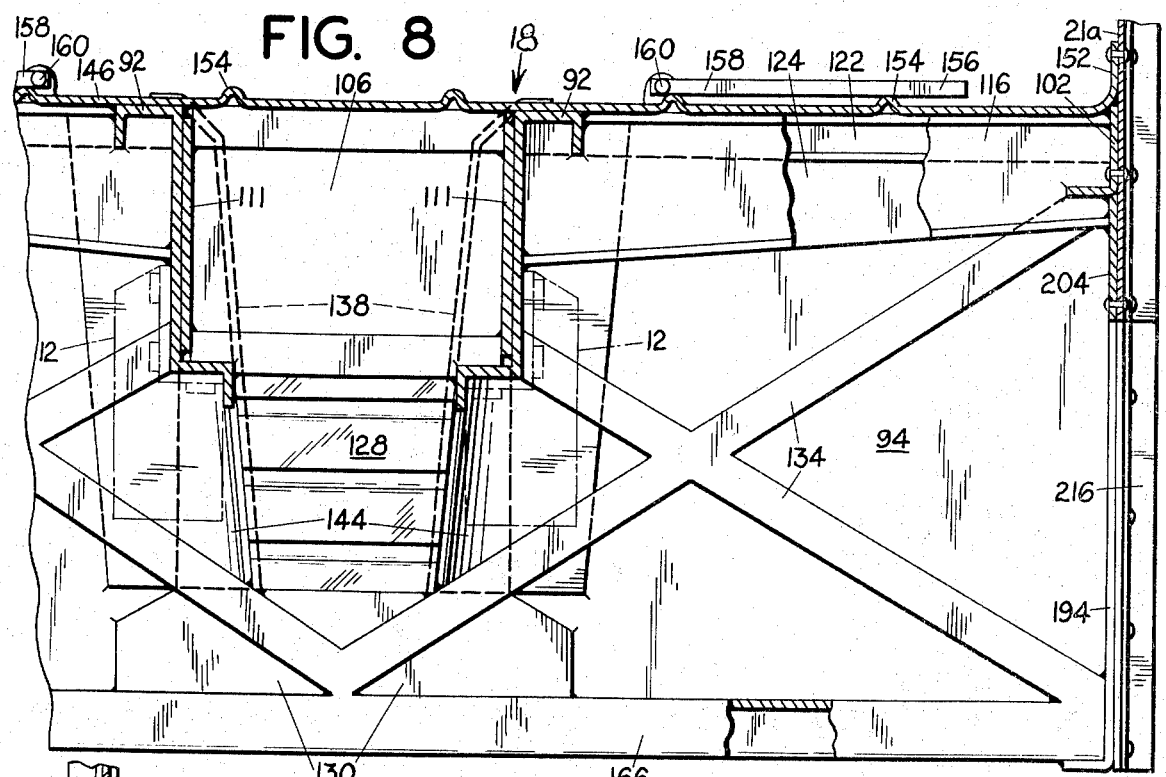
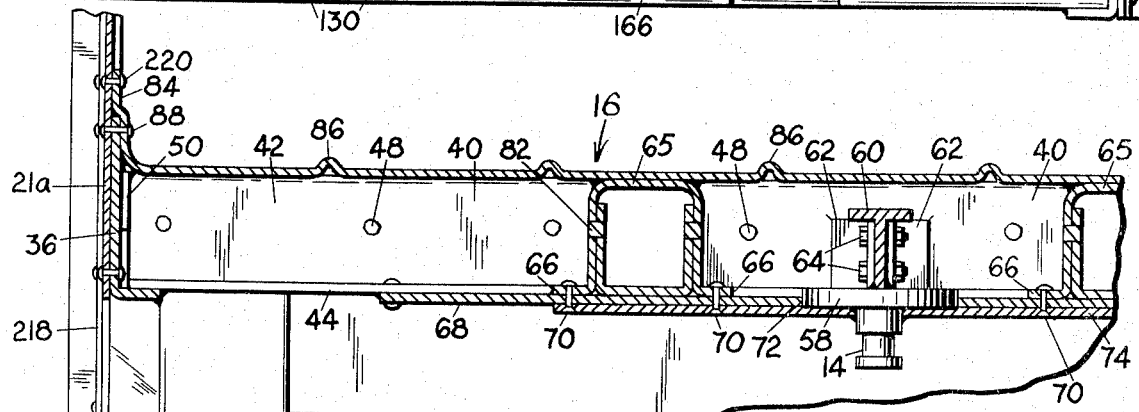
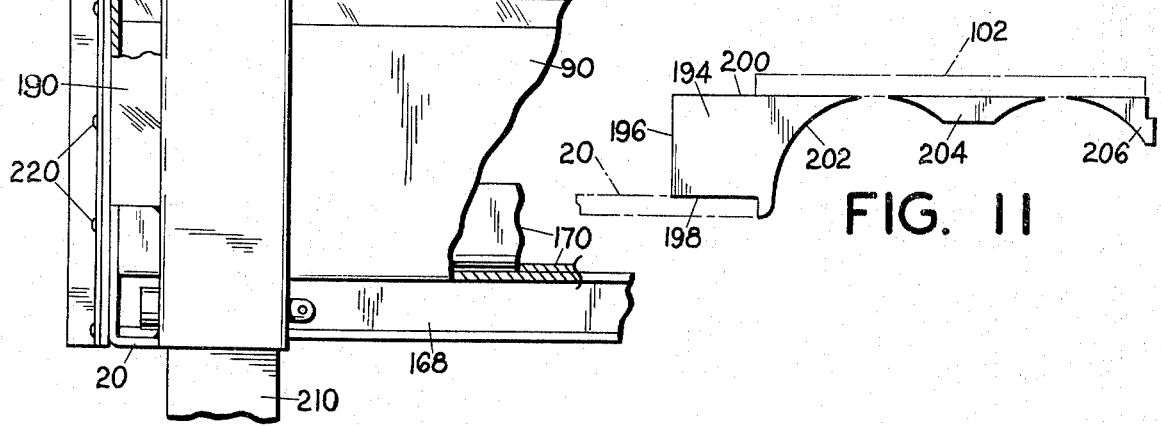

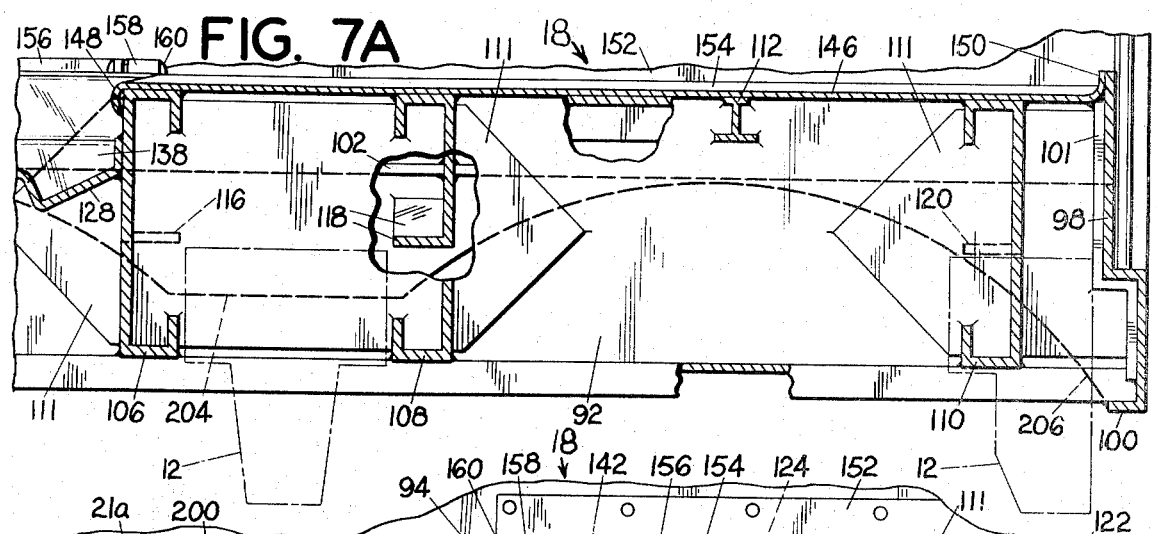
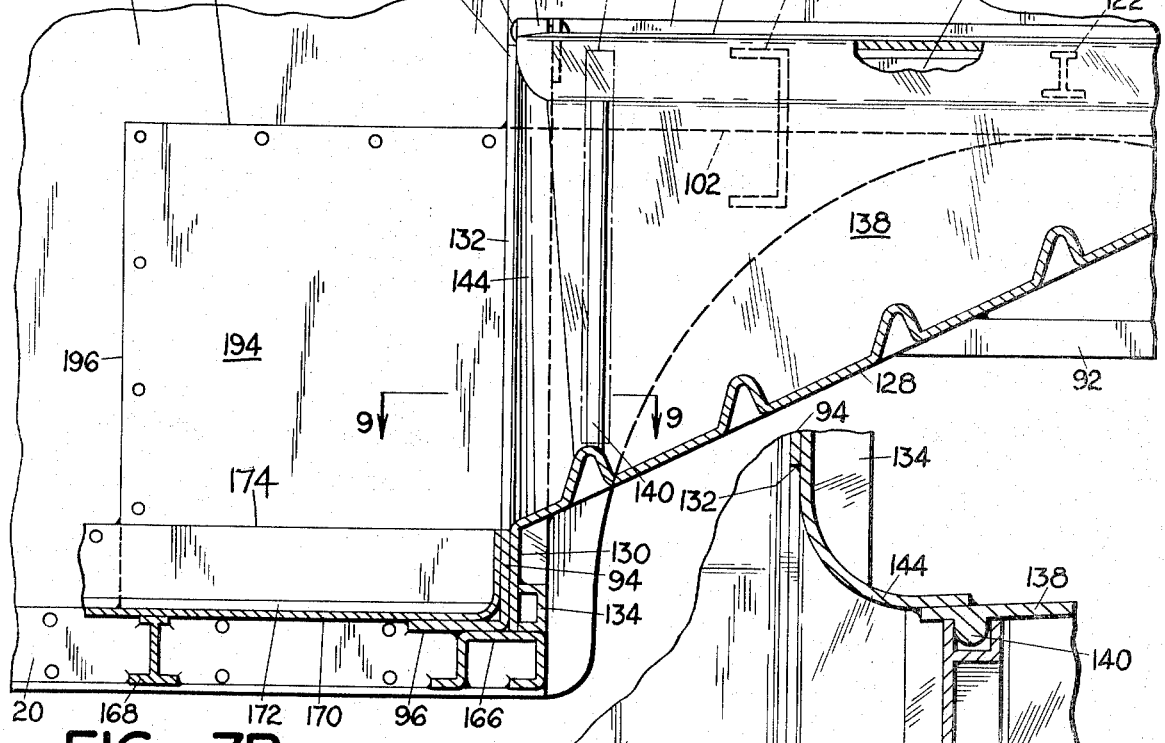
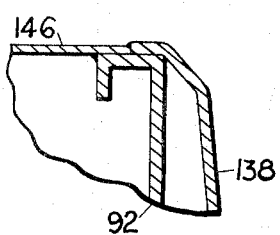
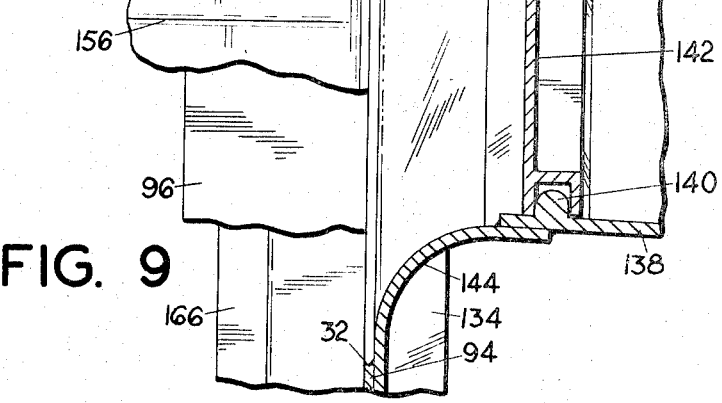

TRAILER CONSTRUCTION

BACKGROUND OF THE INVENTION

This invention relates to new and useful improvements in vehicle structures and is particularly concerned with a trailer construction of the large load hauling type such as for hauling livestock, grain, etc.

Large trailers are commonly in use for transporting livestock and other loads. Such vehicles in view of their immense size are extremely heavy. Thus, a substantial portion of the hauling weight is taken up by the weight of the vehicle. The immenseness of such trailers heretofore used has required heavy framework and other parts, thus reducing the pay load which can be hauled.

SUMMARY OF THE INVENTION

According to the present invention and forming a primary objective thereof, a trailer structure is provided utilizing a minimum of framework, such framework being constructed of a lightweight metal such as aluminum and at the same time having a structural arrangement which possesses the necessary strength for hauling a maximum load, thus increasing substantially the amount of pay load capable of being transported.

Another object of the present invention is to provide a trailer of the type described utilizing front and rear frame sub-assemblies disposed in spaced relation and interconnected by longitudinal rails and also by sheet metal walls which provide a primary portion of the vertical load supporting reinforcement.

Another object is to provide in combination with the said front and rear frame sub-assemblies and the reinforcing sheet metal walls, vertical gusset plate members secured to the frame sub-assemblies and having projecting portions secured to the longitudinal rails and side walls for providing further reinforcement.

Still another object of the invention is to provide a novel enclosing wall portion for a trailer, comprising a sheet metal wall of lightweight metal to which is secured upright reinforcing frame members.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a foreshortened side elevational view, partly diagrammatic, showing a trailer embodying features of the present invention;

FIG. 2 is a fragmentary plan view of a front frame sub-assembly of the trailer, this view being taken on the line 2—2 of FIG. 1 and having portions thereof removed or cut away for clarity;

FIG. 3A is a fragmentary sectional view taken on the line 3A—3A of FIG. 2;

FIG. 3B is a fragmentary sectional view taken on the line 3B—3B of FIG. 2 and comprising a continuation of FIG. 3A, the left side of FIG. 3B continuing on from the right side of FIG. 3A;

FIG. 4 is an elevational view of a gusset plate which is used as a part of a front frame sub-assembly, such gusset plate being shown apart from the sub-assembly;

FIG. 5 is a fragmentary sectional view taken on the line 5—5 of FIG. 2;

FIG. 7A is a fragmentary sectional view taken on the line 7A—7A of FIG. 6;

FIG. 7B is a fragmentary sectional view taken on the line 7B—7B of FIG. 6 and comprising a continuation of FIG. 7A, the left side of FIG. 7A continuing on from the right side of FIG. 7B;

FIG. 8 is a fragmentary sectional view taken on the line 8—8 of FIG. 6;

FIG. 9 is an enlarged fragmentary sectional view taken on the line 9—9 of FIG. 7B;

FIG. 10 is an enlarged fragmentary sectional view taken on the line 10—10 of FIG. 6;

FIG. 11 is an elevational view of a gusset plate assembly which is used as a part of the rear frame sub-assembly, such gusset plate being shown apart from the sub-assembly; and FIG. 12 is a fragmentary vertical foreshortened sectional view taken on the line 12—12 of FIG. 1.

DETAILED DESCRIPTION OF A PREFERRED EMBODIMENT

Figure 6:
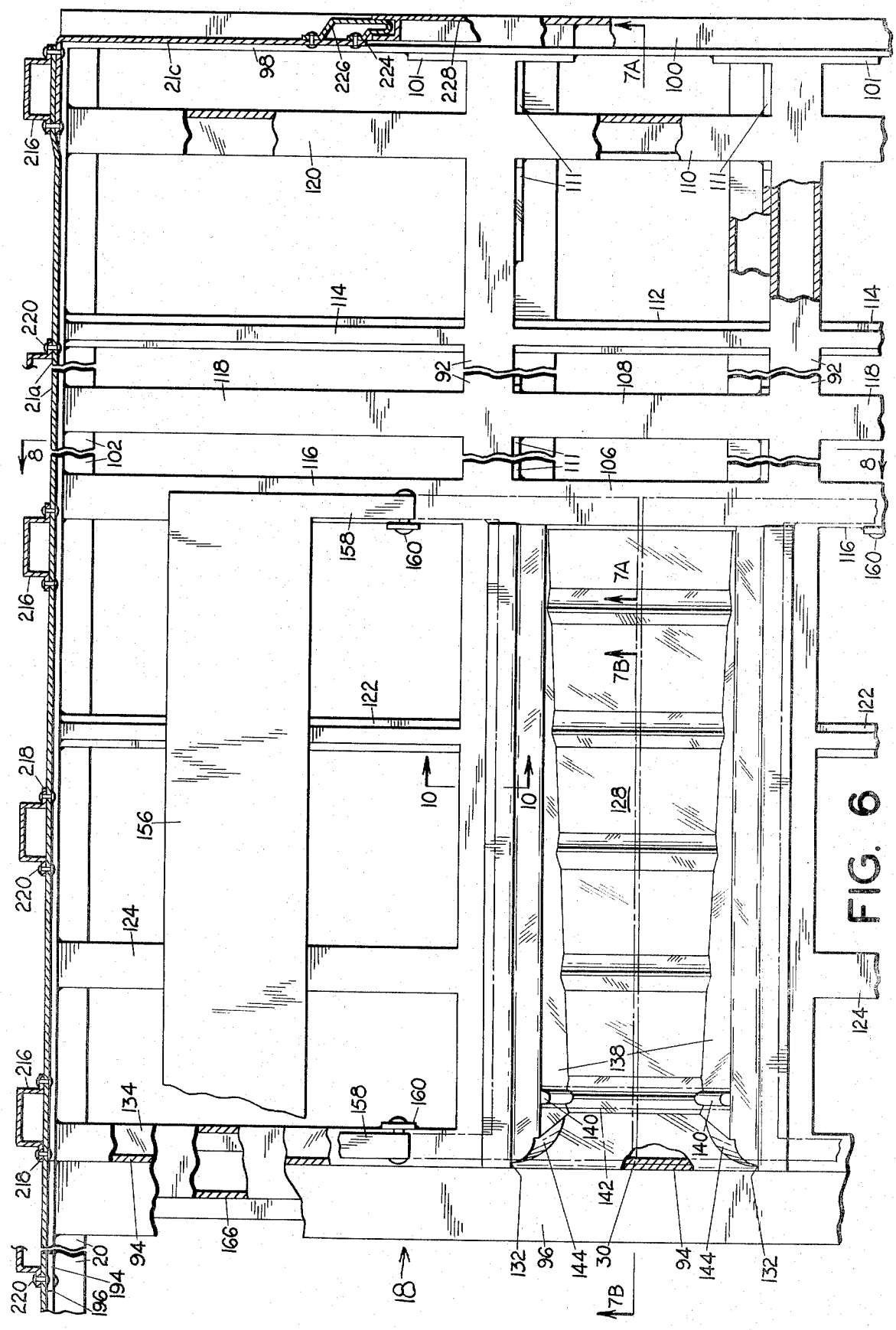
FIG. 6 is a fragmentary plan view of a rear frame sub-assembly of the trailer, this view being taken on the line 6—6 of FIG. 1 and having portions thereof removed or cut away for clarity.

With particular reference to the drawings, and first to FIG. 1, a trailer 10 is shown which incorporates features of the present invention. In the illustration, the trailer has the usual rear wheel assembly 12, shown in phantom lines, and a fifth wheel pin 14 for connection to a pulling tractor. The trailer of the invention employs a front frame sub-assembly 16 and a rear frame sub-assembly 18. These two sub-assemblies are spaced longitudinally apart to form a central or basket portion of the trailer and are interconnected by longitudinal side rails 20, FIG. 1, a sheet metal defining wall 21, and other connecting means to be described. The trailer may be used for transporting any type of product but for purposes of illustration it is shown herein for transporting livestock. In such case, it has an upper deck 22, side swinging gates 24 and 26, and a gate ramp 28 which can be swung to an up position (dotted lines) to form a gate for the upper deck and to a down position (phantom lines) to form a ramp to the upper deck. The particular internal arrangement of the trailer as described is conventional and may include any arrangement of decking and gates as desired. Since the present invention is concerned with providing an extremely lightweight vehicle, however, the upper decking and gates would according to the invention be constructed of lightweight metal or the like, such as aluminum.

As one part of the invention, the front frame sub-assembly 16 and the rear frame sub-assembly 18 are unitized so that they may be constructed apart from the remaining components of the trailer and then used as a base around which the trailer is formed.

FIGS. 2 through 5 show the construction of the front frame sub-assembly 16. FIG. 2 is a fragmentary plan view in which a deck plate, to be described, is completely omitted to better show parts of the frame. The frame sub-assembly 17 comprises a front rail 34, FIGS. 2 and 3A, of angle shape in cross section, and side rails 36, FIGS. 3A and 3B, also of angle shape in cross section and integral with the rail 34. Secured transversely between the side rails 36 are two parallel, heavily constructed frame members 38 and 40, FIGS. 2 and 3. Each of these frame members comprises an inverted channel-shaped portion 42, having bottom outturned flanges 44, and an interfitted channel-shaped portion 46 therein. Frame portions 42 and 46 are secured together by weld inserts 48 provided in suitable aligned holes. The ends of the frame members 38 and 40 are provided with integral right angle gusset plates or doublers 50 which are suitably welded to the side rails 36 to provide an enlarged area connection between the cross frame members and the longitudinal rails.

A pair of longitudinally extending short frame members 54 one on each side of center are secured between the forward frame member 38 and the front rail 34, such frame members also having an integral end gusset plate or doubler 56 to provide a large area securement to the front rail 34. Frame members 54 may be box-shaped in construction similar to frame members 38 and 40.

The fifth wheel pin 14 has integral support with the frame members 38 and 40, and for this purpose such pin is integral with a support disc 58 in turn integral with a longitudinal frame member 60 of T-shape construction. It is desired that the fifth wheel pin and its supporting members 58 and 60 be of steel construction, and for connecting this fifth wheel mechanism to the cross frames 38 and 40, which preferably are of aluminum, said cross frames have vertical right angle brackets 62 welded thereto and the frame member 60 is bolted to such brackets by bolts 64. Secured betwen the frame members 38 and 40 on each side of the frame member 60 are box-like members 65 of similar construction as frame members 38 and 40, these frame members also having base flanges 66.

To further integrate the elements of the frame sub-assembly 16, a plate 68 is secured underneath the cross frame members 38 and 40. The side edges of reinforcing plate 68 terminate short of the sides of the trailer, FIG. 2, and the forward end extends to and is secured to the front rail 34. The rearward end of this plate terminates at about the rearward side of frame member 40. The plate 68 is welded wherever possible, such as to frame member 34, and in addition may have rivet connection 70 with flanges 44 of cross frames 38 and 40 and frame members 65. Plate 68 is apertured at 72 to receive the support disc 58 of the fifth wheel pin 14.

A scuff plate 74 is disposed on the bottom side of the reinforcing plate 68 and has an upturned front lip 76. This plate has a weld connection to the fifth wheel pin 14 and to support disc 58 and is constructed of steel.

Side rails 36 extend rearwardly beyond the rear cross frame member 40 and are secured integrally together at this rearward extension by transverse I-beam frame members 80. The front frame sub-assembly 16 has a deck 82 seen in FIGS. 3A, 3B, and 5. This deck has an upturned lip 84 around the front and sides thereof and has upstanding ribs 86 for reinforcement. The upturned lip 84 is secured to the wall 21 of the trailer as by rivets 88, as will be more apparent hereinafter, and serves not only as a reinforcement but also to confine any droppings or the like from livestock within the trailer. The rearward portion of the frame sub-assembly 16 has a depending rear wall 90, FIGS. 3B and 5, secured between the side rails 36. Wall 90 forms the front wall of the basket or center portion of the trailer and furthermore has connection with longitudinal rails 20, as will be described more fully hereinafter. This wall has a rearwardly turned flange 91.

The rear sub-assembly 18 is illustrated in detail in FIGS. 6, 7A, 7B, 8, 9 and 10. In FIG. 6, the decking is completely omitted to more clearly show the frame portions. This frame sub-assembly comprises a pair of heavy duty longitudinally extending bogie rails 92 which as seen in FIGS. 6 and 8 are disposed in parallel relation and located toward the center of the sub-assembly. These rails comprise reversely turned angle member of the shape best seen in FIG. 8, secured at their forward ends to a front wall 94, FIGS. 6, 7B and 8, having a forwardly turned bottom flange 96. The rearward ends of bogie rails 92 are secured to a rear transverse frame member 98 having a bottom channel-shaped reinforcing portion 100, the connection between bogie rails 92 and the rear frame member 98 being accomplished through gusset plates or doublers 101. Rear sub-assembly 18 has longitudinally extending side rails 102, FIGS. 7A, 7B, and 8, of angle shape in cross section, secured to the rear frame member 98 and to the front wall 94, as by welding.

The rearward portion of the frame sub-assembly 18 between the bogie rails 92 has reinforcing cross frame members 106, 108 and 110 which as best seen in FIG. 7A comprise C-shaped beams having the same vertical height as bogie rails 92. They have connection to the bogie rails by gusset plates or doublers 111. An I-beam 112 also extends transversely between the bogie rails 92 and is secured thereto for further reinforcement. I-beams 114 also extend between the bogie rails 92 and the respective side rails 102 and furthermore auxiliary cross frame members 116, 118 and 120 extend from the bogie rails to the respective side rails 102, such cross frame members being in alignment transversely with the main cross frame members 106, 108 and 110, respectively. Bogie rails 92 forward of the auxiliary frame members 116 also having reinforcing connection with the side rails 102 by I-beams 122 and C-shaped cross frame members 124.

Extending forwardly and downwardly from the cross frame member 106 between the bogie rails 92 is a ramp 128 having a downturned bottom flange 130 secured, as by welding, to front wall 94. Front wall 94 has an opening 132 for the ramp, and the back side of wall 94 has reinforcing, channel-shaped frame members 134 secured thereto.

The ramp is defined at its side by plates 138 which have an angled bottom edge, FIG. 7B, aligned with the bottom surface of the ramp 128 and which at their top edge are bent over, FIG. 10, on top of the respective bogie rails 92. The side walls 138 of the ramp adjacent to the bottom of the latter have vertically disposed, inwardly directed projections 140 which serve as a guide for a gate 142, shown in phantom lines in FIGS. 6 and 7B, such gate being removable merely by lifting it up out of engagement from the projections 140. The forward end of the ramp is provided with a rounded guide wall 144 on each side to eliminate any sharp edges at the bottom end of the ramp.

The deck 146 on the sub-assembly 18 is secured on the top of bogie rails 92 and the several cross frame members, and as best seen in FIG. 7A, the forward end of such deck outwardly of the ramp bends down at 148 over the cross frame members 116. The rearward end of the deck is bent up slight at 150, and the sides, FIG. 8, are bent up at 152 for rivet connection to the walls, as will be described. Deck 146 has upstanding ribs 154 for reinforcement.

A cover is provided for the ramp so that livestock can be loaded on the deck 146, and for this purpose a pair of cover portions 156, best seen in FIGS. 6 and 8, have end arms 158 hingedly connected at 160 to front wall 94 and cross frame member 116. These cover portions are arranged such that when folded inwardly each will cover one-half of the ramp, as shown in phantom lines in FIG. 6, and when folded outwardly, as shown in full lines in FIG. 6, the cover portions will be out of the way of the ramp.

The side rails 20 extend longitudinally between the end frame sub-assemblies 16 and 18, FIGS. 1, 3B, 5, and 7B. With reference to FIG. 3B, the forward ends of the side rails 20 are secured to the bottom of wall 90, and with reference to FIG. 7B, the rearward end of these side rails are secured to the flange 96 of front wall 94. At this rearward end, a C-shaped cross frame member 166 is secured between the side rails 20 and is also secured to adjacent members, namely, to flange 96, the bottom wall 94, and reinforcing frame members 134. Side reinforcing means at the end connections of the longitudinal frame members 20 are utilized but will be described hereinafter.

Transversely secured between the side rails 20 and I-beams 168, FIGS. 3B, 5, 7B and 12, and these I-beams support a deck 170 having upstanding ribs 172 for reinforcement. The peripheral portion of the deck 172 has an upturned flange 174. The forward end of the deck 172 seats on the flange 91 of wall 90 and the rearward end of the deck seats on the flange 96 of wall 94.

With reference to FIGS. 1, 3B, and 4, gusset plates 176 are secured on each side at the rearward end of the front frame sub-assembly to the body of the trailer. These gusset plates are of the shape shown in FIG. 4, having a vertical dimension which extends above and below the frame sub-assembly 16 and have a rear vertical edge 178 and upper and lower angled forward edges 180. A slot 182 extends rearwardly from the front edge of the gusset plates between the angled edges 180, and this slot is of a dimension to receive a rearward end portion of side rails 36. In assembled relation, the edges which define the top of slots 182 are butt welded along the top edge of respective rails 36 and the edges which define the bottom of slots 182 are butt welded along the bottom of respective rails 36. The bottom edges 184 of gusset plates 176 are butt welded to the top of respective side rails 164 and the top edges 186 are butt welded to the bottom edges of respective longitudinal rails 188 which form a part of upper deck 22. The bottom one of edges 180 has an inturned flange 190, FIGS. 3B and 5, for reinforcement.

A rear gusset plate 194, FIGS. 1, 7B and 11 is also provided on each side for reinforcement and connection of the subassembly 18 to the body of the trailer. These gusset plates have a forward vertical edge 196, a bottom edge 198, a top edge 200 and a concave rear edge 202. The bottom edges 198 have a butt weld connection to the top edges of respective rails 20, and the top edges 200 have a butt weld connection to the bottom edges of respective side rails 102. Concave edges 202 have a curvature necessary for clearing the wheel assembly. For further reinforcement of the rear frame sub-assembly, auxiliary gusset plates 204 and 206 are butt welded to the bottom edge of respective side rails 102 and are shaped to clear the wheel assembly.

The forward end of the vehicle has a pair of legs 210, FIGS. 1, 3B and 5, having telescoping engagement in vertical box-like housings 212 secured to the front wall 90, to the side rails 36, to the inturned flange 190 of gusset plate 176, and to side rails 20. The legs 210 and their housings 212 have suitable apertures to receive a lock pin 214, the aperture being arranged to provide raised and lowered set positions for the legs in a well known manner.

The principal portion of the vertical rigidity of the present vehicle is accomplished by the enclosing walls 21 therearound. Such walls are formed of a strong but lightweight material such as aluminum sheet metal and are associated with upright reinforcing channel-shaped posts 216 having outwardly directed base flanges 218. With reference to FIGS. 1, 3B and 7B, the side walls 21a of the vehicle take the shape of the vehicle as shown, namely, they extend to the front and rear edges of the vehicle, the top edge thereof, and to the bottom edge. They follow the bottom edge of frame sub-assemblies 16 to the point of juncture of bottom angled edge 180 of gusset plate 176 therewith, down such angled edge to the bottom of side rails 20 and through the length thereof, up the contoured edge 202 of gusset plate 194 and around the contour of auxiliary gusset plates 204 and 206. Wherever possible, posts 216 and the walls 21a are secured to trailer frame structure by rivets 220, such as for example to side rails 36, FIG. 5, to the upturned side portions 84 of the deck 82 on the frame component 16, to the gusset plates 176, FIG. 3B, to the longitudinal side rails 20, FIGS. 3B and 7B, to the upturned portions 174 of the deck 170, FIG. 2, to the rear gusset plate 194, FIG. 7B, to the upturned portions 152 of deck 146, FIG. 7B, and to any other place possible to provide a rigid connection between said side wall sheeting 21a and the frame or reinforcing portions.

The front wall 21b extends along the front, FIG. 2, with end portions 222 bent around the sides and having overlapping engagement with the side walls 21a under a post 216.

Rear wall portions 21c, FIG. 6, extend around from side walls on each side and terminate at a door opening 224. Disposed in vertical relation at the door opening is a pair of posts 226 on which a rear door 228 slides vertically. The rear door could as well swing horizontally if desired.

The top of the vehicle has a peripheral frame member 230, FIGS. 1 and 12, comprising an outer rounded portion 232 and a parallel right angle inner portion 234 interconnected with the outer portion 232 by a radial web 236. The upper ends of side walls 21a and the posts 216 are received between the portions 232 and 234 and are riveted in place. Extending transversely of the vehicle at the top are roof bows 238, FIG. 12, which also fit between portions 232 and 234 and are secured in place by rivets 220. A roof 21d is supported on frame members 238 and is also riveted in place. The longitudinal rails 188 of upper deck 22 has transverse frame members 240, FIG. 12, secured to and supported thereon. Cross frame members 240 support a deck member 242 having upturned end portions 244 riveted to the walls of the trailer and to channel members 216.

According to the invention, substantially the entire trailer is constructed of lightweight metal such as aluminum, the only iron or steel parts comprising the fifth wheel pin 14 and support means therefor and of course the rear wheel assembly. Although substantially the entire trailer is of lightweight metal, the particular arrangement and connection of the parts provide the necessary strength to haul maximum loads. That is, the front and rear sub-assemblies 16 and 18, respectively, although of aluminum, are constructed for maximum strength, and these components in combination with the defining wall 21, as well as the longitudinal rails and other frame portions therebetween and the upper deck 22, as well a the roof structure, provide the necessary vertical rigidity to support the load. The side walls, as well as the end walls, although made up of multiple panels, perform structurally as a one-piece covering. For this purpose, the panels are overlapped in their vertical joints under the side post frame members 216 in the manner illustrated at the top left of FIG. 2 in the joint between the front wall 21b and side walls 21a. Importantly, the gusset plates 176 and 194 provide a rigid vertical connection between the basket portion of the trailer and the end frame sub-assemblies 16 and 18, respectively. These gusset plates provide for vertical connection and also resist any lateral twisting between the end frame components and intermediate frame members. With substantially all the parts being of a lightweight material, a maximum pay load can be hauled.

Another feature of the present vehicle is that the end frame sub-assemblies 16 and 18 provide for unitized construction in the shop and facilitate construction of the vehicle therearound, either in the same shop or for furnishing to other shops as a component part.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A trailer structure having forward and rearward ends, said trailer comprising a horizontal frame sub-assembly at each end in longitudinally spaced relation, each frame sub-assembly having longitudinal and cross frame members forming individual rigid units, longitudinal frame members at the sides of the trailer, said longitudinal frame members being disposed below said end sub-assemblies and forming a basket portion of the trailer, deck means supported on said sub-assemblies and on said side frame members, a vertical gusset plate on each side of said front end sub-assembly adjacent to the rear thereof and a gusset plate on each side of said rear end sub-assembly adjacent to the front thereof, said gusset plates being secured to their respective sub-assemblies and to said longitudinal frame members, side walls secured to said frame sub-assemblies and to said longitudinal frame members, upright reinforcing channel-shaped frame members disposed in parallel spaced relation through the length of said trailer secured to the side walls as well as to the end sub-assemblies and to the longitudinal frame members, said side walls comprising sheet metal of sufficient gauge to produce with said upright frame members a vertical rigidity between the end frame sub-assemblies sufficient to bear the load between said ends.

2. The trailer structure of claim 1 wherein each of said end frame sub-assemblies comprises longitudinal frame members and lateral frame members interconnected between said longitudinal frame members, the connection between said longitudinal frame members and said lateral frame members comprising cross gusset plates secured to the end of said lateral frame members and secured flatwise against said longitudinal frame members, said gusset plates being of greater dimension than the cross section dimension of said lateral frame members to provide an enlarged area of connection.

3. The trailer structure of claim 1 wherein said side walls are formed of multiple panels in side by side relation with vertical edge portions overlapped, said upright frame members being secured to said side walls at the overlapping portions of said edge portions for establishing a rigid load bearing connection between the wall panels.

4. The trailer structure of claim 1 wherein said gusset plates at said forward sub-assembly extends upwardly beyond said sub-assembly and downwardly below said sub-assembly to provide an enlarged area for reinforcing securement to said side walls.

5. The trailer structure of claim 4 wherein each of said gusset plates at said forward sub-assembly has a front opening longitudinal slot for receiving a rearward portion of said forward sub-assembly for securement thereto.

6. The trailer structure of claim 1 wherein said rear sub-assembly has a ramp leading down to said basket portion of the trailer for loading cattle from said basket portion to said rear sub-assembly.

* * * * *